US008965405B2

(12) United States Patent
Hodges et al.

(10) Patent No.: US 8,965,405 B2
(45) Date of Patent: Feb. 24, 2015

(54) SYSTEM AND METHOD FOR DISSEMINATING USER LOCATION INFORMATION

(71) Applicant: WaveMarket, Inc., Emeryville, CA (US)

(72) Inventors: Daniel Hodges, San Francisco, CA (US); Tasos Roumeliotis, Orinda, CA (US); Scott Hotes, Berkeley, CA (US)

(73) Assignee: WaveMarket, Inc., Emeryville, CA (US)

( * ) Notice: Subject to any disclaimer, the term of this patent is extended or adjusted under 35 U.S.C. 154(b) by 218 days.

(21) Appl. No.: 13/664,039

(22) Filed: Oct. 30, 2012

(65) Prior Publication Data

US 2014/0120951 A1 May 1, 2014

(51) Int. Cl.
*H04W 4/02* (2009.01)
*H04W 12/06* (2009.01)
*H04W 12/08* (2009.01)
*H04L 29/08* (2006.01)

(52) U.S. Cl.
CPC .............. *H04L 67/325* (2013.01); *H04W 4/02* (2013.01)
USPC .................. 455/456.2; 455/67.11; 455/404.2; 455/412.1; 455/414.1; 455/422.1; 455/450; 455/456.1; 455/456.3; 455/456.6; 455/457

(58) Field of Classification Search
CPC ....... H04W 4/02; H04W 12/06; H04W 12/08; H04L 63/20
USPC .......... 455/67.11, 456.1, 456.2, 456.3, 456.6, 455/457, 404.2, 412.1, 414.1, 450; 342/357.64, 450, 457
See application file for complete search history.

(56) References Cited

U.S. PATENT DOCUMENTS

| 2005/0043037 A1* | 2/2005 | Ioppe et al. ................. 455/456.1 |
| 2010/0153483 A1* | 6/2010 | Offermann et al. ........... 709/203 |
| 2011/0035265 A1* | 2/2011 | King et al. .................. 705/14.13 |
| 2014/0033304 A1* | 1/2014 | Lewis ............................. 726/22 |

\* cited by examiner

*Primary Examiner* — Inder Mehra
(74) *Attorney, Agent, or Firm* — Dovas Law, P.C.

(57) ABSTRACT

A computer-implemented method for disseminating user mobile device location information is provided. The method includes enabling a first request for location information of a mobile device based on at least one of a particular schedule and a particular criterion. Mobile device location information is received responsive to the first request. The mobile device location information received responsive to the first request is stored. A second request for the mobile device location information is received from a requester. Responsive to the second request, the requester is provided the location information received responsive to the first request, and at least one user-visible consequence is initiated responsive to the second request, wherein the at least one user-visible consequence is not initiated responsive to the first request.

29 Claims, 3 Drawing Sheets

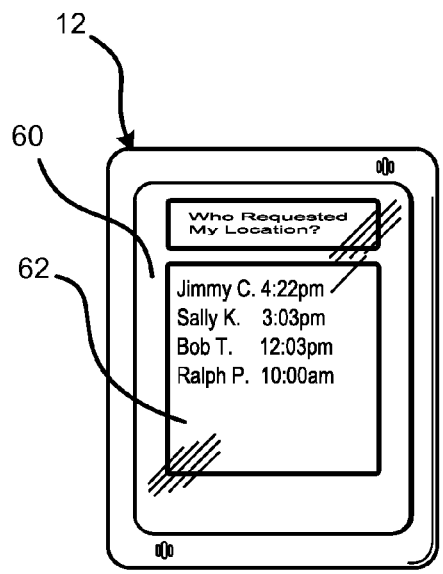 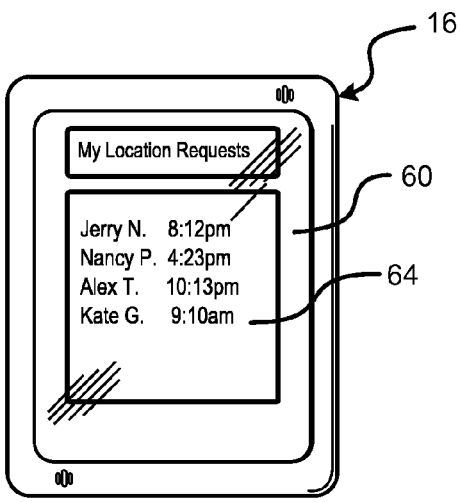
FIG. 3A  FIG. 3B
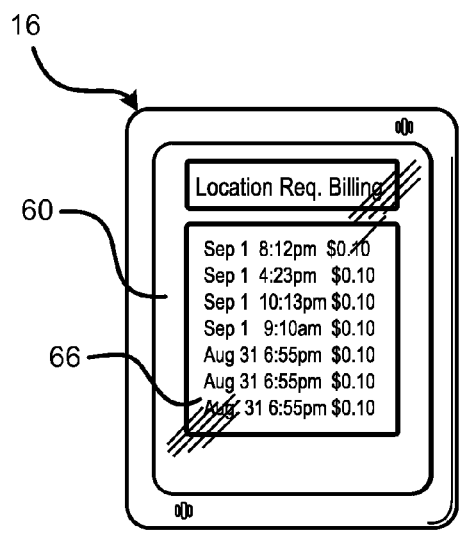 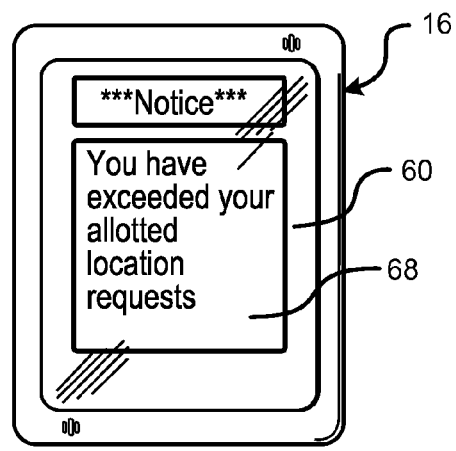
FIG. 3C  FIG. 3D

SYSTEM AND METHOD FOR DISSEMINATING USER LOCATION INFORMATION

BACKGROUND

Conventional mobile communication device locator applications enable a user to request a target user's location. Depending on the application configuration, the target user may be different from or the same as the requesting user. A user may request his or her own location or the location of another. A user requests a location and the locator application initiates a chain of events that will ultimately return location information to the user, for example putting in a request to a telecommunication carrier application program interface ("API") to triangulate the location of the targeted mobile communication device. The chain of events that ultimately returns location information to the user can take anywhere from seconds to minutes. This noticeable wait time can have a negative impact on the user experience.

Oftentimes, the act of requesting a location has consequences (referred to hereinafter as "request consequences") which may be manifested in user-observable changes in the device user interface or application behaviors. Request consequences enabled by an application can include generating a history view showing location requests, generating billing events based on the location requests, notifying the target user of the location request for privacy reasons, and throttling the number of location requests allowed by a user. In each of these examples, the application takes some action in response to the location request, which action may or may not be desirable to a user initiating the location request.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A computer-implemented method for disseminating user mobile device location information is provided. The method includes enabling a first request for location information of a mobile device based on at least one of a particular schedule and a particular criterion. Mobile device location information is received responsive to the first request. The mobile device location information received responsive to the first request is stored. A second request for the mobile device location information is received from a requester. Responsive to the second request, the requester is provided the location information received responsive to the first request, and at least one user-visible consequence is initiated responsive to the second request, wherein the at least one user-visible consequence is not initiated responsive to the first request.

Further provided is a computer-implemented method for disseminating user mobile device location information including enabling a first plurality of requests for location information of a mobile device based on at least one of a particular schedule and a particular criterion. Mobile device location information is received responsive to the first plurality of requests. The mobile device location information received responsive to the first plurality of requests is stored. A second plurality of requests for the mobile device location information is received from a requester. For ones of the second plurality of requests which when received correspond to stored location information meeting a particular level of freshness, the requester is provided the location information meeting the particular level of freshness received responsive to a corresponding earlier one of the first plurality of requests. For ones of the second plurality of requests received while one of the first plurality of requests is pending, the requester is provided the location information received responsive to the pending request when available. For ones of the second plurality of requests not corresponding to location information meeting a particular level of freshness and not received while one of the first plurality of requests is pending, the one of the second plurality of requests for the mobile device location information is enabled, the mobile device location information provided responsive to the one of the second plurality of requests is received, and the requester is provided the location information received responsive to the one of the second plurality of requests. The second plurality of requests corresponds to at least one user-visible consequence which does not correspond to the first plurality of requests.

Further provided is a system comprising a non-transitory computer readable storage medium having encoded thereon instructions that, when executed by one or more processors of the system, cause the system to perform a process including enabling a first plurality of requests for location information of a mobile device based on at least one of a particular schedule and a particular criterion. Mobile device location information is received responsive to the first plurality of requests. The mobile device location information received responsive to the first plurality of requests is stored. A second plurality of requests for the mobile device location information is received from a requester. For ones of the second plurality of requests which when received correspond to stored location information meeting a particular level of freshness, the requester is provided the location information meeting the particular level of freshness received responsive to a corresponding earlier one of the first plurality of requests. For ones of the second plurality of requests received while one of the first plurality of requests is pending, the requester is provided the location information received responsive to the pending request when available. For ones of the second plurality of requests not corresponding to location information meeting a particular level of freshness and not received while one of the first plurality of requests is pending, the one of the second plurality of requests for the mobile device location information is enabled, the mobile device location information provided responsive to the one of the second plurality of requests is received, and the requester is provided the location information received responsive to the one of the second plurality of requests. The second plurality of requests corresponds to at least one user-visible consequence which does not correspond to the first plurality of requests.

Further provided is non-transitory computer-readable media tangibly embodying a program of instructions executable by a computing device to implement a method, the computing device being capable of interfacing with a communications network, the method comprising enabling a first plurality of requests for location information of a mobile device based on at least one of a particular schedule and a particular criterion. Mobile device location information is received responsive to the first plurality of requests. The mobile device location information received responsive to the first plurality of requests is stored. A second plurality of requests for the mobile device location information is received from a requester. For ones of the second plurality of requests which when received correspond to stored location information meeting a particular level of freshness, the requester is provided the location information meeting the particular level of freshness received responsive to a corresponding earlier one of the first plurality of requests. For ones of the second plurality of requests received while one of the first plurality of requests is pending, the requester is provided the location information received responsive to the pending request when available. For ones of the second plurality of requests not corresponding to location information meeting a particular level of freshness and not received while one of the first plurality of requests is pending, the one of the second plurality of requests for the mobile device location information is enabled, the mobile device location information provided responsive to the one of the second plurality of requests is received, and the requester is provided the location information received responsive to the one of the second plurality of requests. The second plurality of requests corresponds to at least one user-visible consequence which does not correspond to the first plurality of requests.

BRIEF DESCRIPTION OF THE DRAWING(S)

A more detailed understanding may be had from the following description, given by way of example with the accompanying drawings. The figures in the drawings and the detailed description are examples. The figures and the detailed description are not to be considered limiting and other examples are possible. Like reference numerals in the figures indicate like elements wherein:

FIGS. 3A-3D show example screen displays resulting from user-visible request consequences.

DETAILED DESCRIPTION OF ILLUSTRATIVE EMBODIMENT(S)

Figure 1:
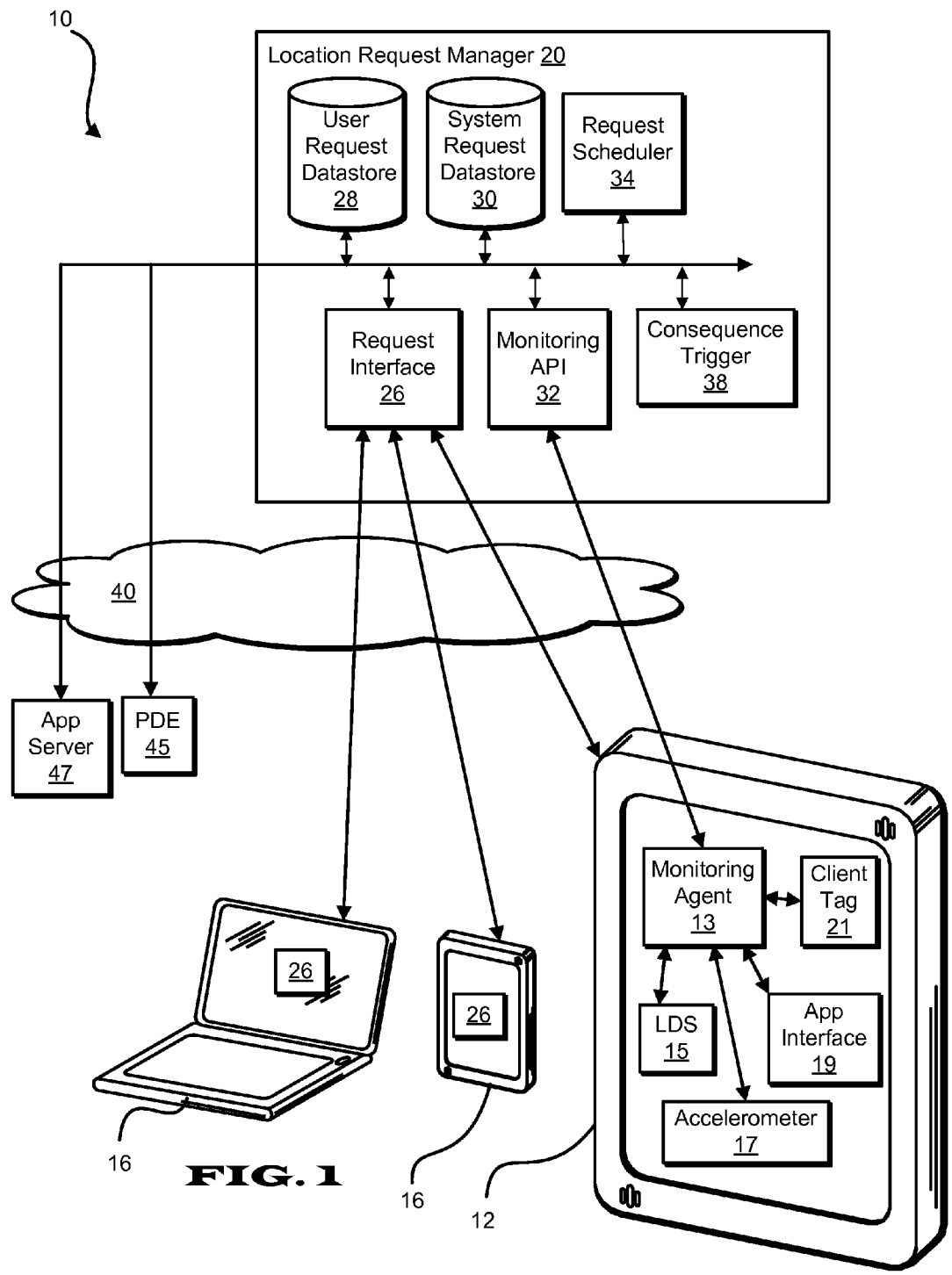
FIG. 1 shows a system for disseminating mobile device location information.

Embodiments are described below with reference to the drawing figures where like numerals represent like elements throughout.

Referring to FIG. 1, a system 10 is provided including a location request manager 20 used for disseminating location information of a user's wireless mobile communication device. The location request manager 20 enables a request interface 26, a user request datastore 28, a system request datastore 30, a monitoring application program interface ("API") 32, a request scheduler 34, and a consequence trigger 38. The location request manager 20 can be implemented on one or more network accessible computing systems in communication via a network 40 with one or more wireless mobile communication devices 12 which correspond to one or more monitored users and are monitored via a monitoring agent 13. Alternatively, the location request manager 20 or one or more components thereof can be executed on the monitored mobile communication device 12 or other system. The request interface 26 can include a web application or other application enabled by the location request manager 20 and accessible to the monitored mobile communication device 12 or other client device 16 via a network and/or executed by the mobile communication device 12 or other client device 16.

Software and/or hardware residing on the monitored mobile communication device 12 enable the monitoring agent 13 to provide location information to the location request manager 20 via the monitoring API 32. The mobile device 12 can include for example a smartphone or other wireless mobile terminal preferably configured to operate on a wireless telecommunication network. The mobile device 12 includes a location determination system ("LDS") 15, such as a global positioning system ("GPS") receiver from which the monitoring agent 13 gathers data used for determining user location. The mobile device 12 can also be provided with an accelerometer 17 to provide additional data regarding user motion as is typical with modern smartphones. A monitored user carries the mobile device 12 on their person with the monitoring agent 13 active.

If appropriately authorized, a requesting user using client device 16 can request and receive location of the monitored user's mobile device 12 via the request interface 26. The request interface 26 can include a web application or other application enabled by the location request manager 20 and accessible to the monitored mobile communication device 12 or other client device 16 via a network and/or executed by the mobile communication device 12 or other client device 16. Alternatively, a user can request his/her own location directly via the monitoring agent 13 or through a call to the request interface 26 of the location request manager 20. The act of requesting location triggers a user-visible request consequence, for example generating a history view showing location requests, generating billing events based on the location requests, notifying the target user of a location request to address privacy concerns, and throttling the number of location requests allowed by a user.

The location request manager 20 is further configured to autonomously request location information of a mobile device 12 without direct input from a requesting user. Whereas one or more user-visible request consequences result from a user-initiated location request, autonomously requested location information does not trigger a request consequence, or alternatively, does not trigger at least one of the request consequences triggered by a user request. The location request manager 20 is configured to anticipate a monitoring user's location request and make its own autonomous request such that a location request is already in progress or a location request has already been fulfilled at the time the monitoring user requests location. As a result, received location information can be more quickly provided to the monitoring user with lower latency than if only a user's location request is enabled, yet user-visible request consequences preferably operate only based on a user location request.

The location request manager 20 bases the timing of its autonomous request on a suitable schedule or one or more criteria. The particular schedule or particular criteria is preferably predetermined to anticipate a monitoring user's location request such that the autonomous request is made a suitable time prior to the time it is expected that the monitoring user will initiate a location request. For example, the location request manager 20 can initiate a chain of events involved in locating a target user mobile device 12 responsive to a monitoring user activating (e.g. signing in to) a user interface of an application which enables user location requests, such as the request interface 26, or in the case where the targeted user is the monitoring user, the application interface 19. This process assumes such user will initiate a location request soon after activating the application user interface. Alternatively, the location request manager 20 can initiate a location request based on an extrapolation of the timing of past location requests made by the monitoring user and/or the timing of past requests of an aggregate of users. The assumption in such case is that a monitoring user's location request timing follows a pattern, for example that future requests may occur at the same time of day as past requests. Alternatively, the location request manager 20 can initiate a location request based on any suitable schedule in an effort to anticipate a monitoring user's location request.

Location requests autonomously enabled by the location manager 20 and their corresponding location information results are stored in the system request datastore 30. Location requests made by a monitoring user, via the monitored mobile device 12 or other client device 16, and their corresponding location information results are stored in the user request datastore 28. Location requests and their corresponding results stored in the user request datastore 28 correspond to one or more user-visible request consequences, whereas location requests and their corresponding results stored in the system request datastore 30 do not correspond to one or more of the request consequences associated with data in the user request datastore 28. The consequence trigger 38 triggers user-visible request consequences via communication with remote application servers 47 or communication with the monitoring agent 13 or other local application on the monitored device 12. Preferably, the consequence trigger 38 triggers a user visible request consequence for all user location requests and no system location requests.

Request consequences are triggered based on the information in the user request datastore 28. The location request manager 20 supports a history view feature providing a listing of prior location requests and associated locations to a user, wherein historical data are pulled from the user request datastore 28 rather than the system request datastore 30. The location request manager 20 further supports billing events reconciled based on data in the user request datastore 28. The location request manager 20 further supports privacy notifications alerting a user that another user has requested her location, which notifications are based on data in the user request datastore 28.

Figure 2:
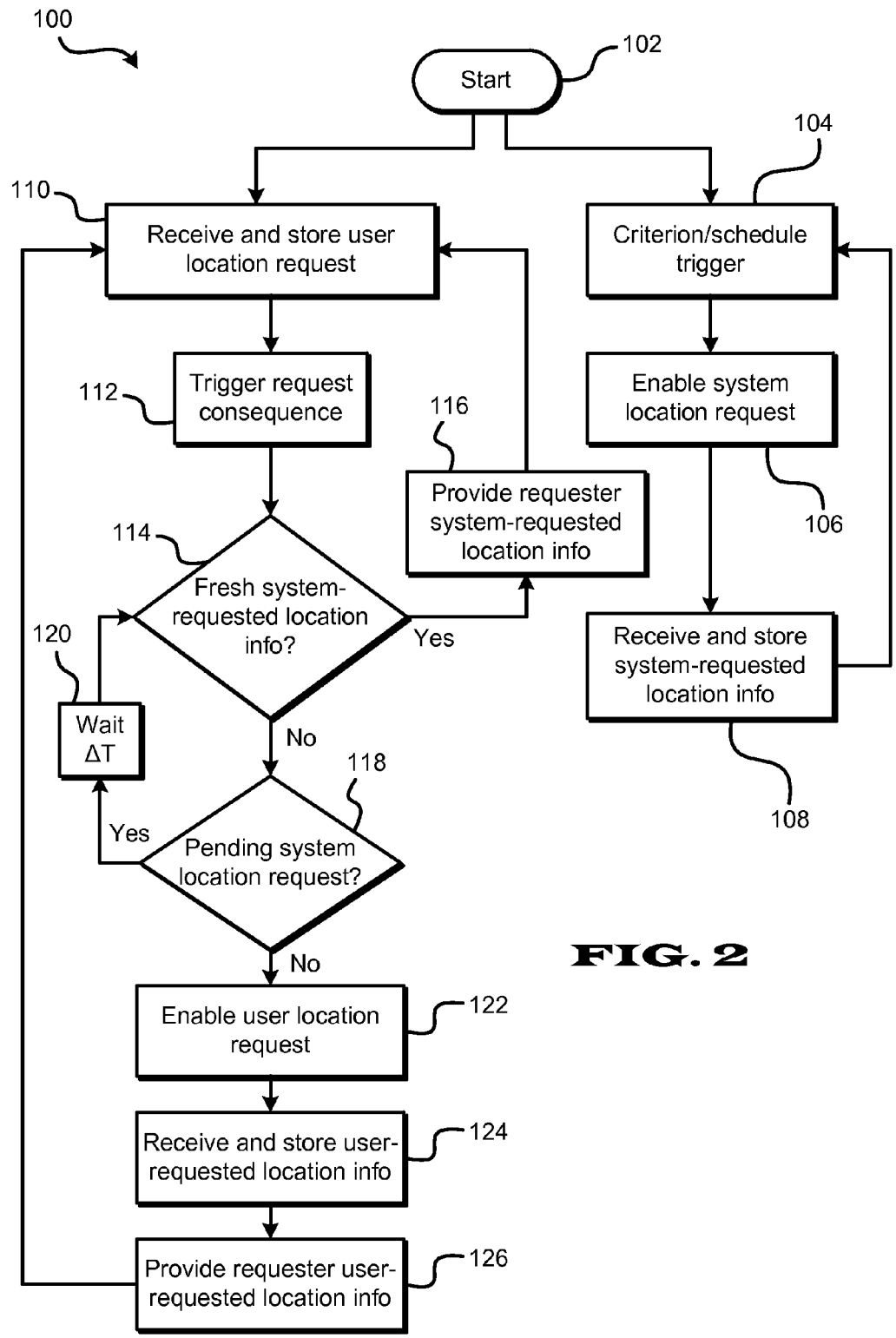
FIG. 2 is a diagram showing a method for disseminating mobile device location information

Referring to FIG. 2, a method 100 for disseminating user mobile device location information is shown. The method 100 is described with reference to the components shown in the system 10 of FIG. 1, including the location request manager 20 and monitoring agent 13, which are preferably configured for performing the method 100 and include or have access to suitable non-transitory data storage including instructions for performing the method. The method 100 may alternatively be performed via other suitable system or systems in other suitable environments. The method starts at step 102.

A request for location information of a particular mobile device 12 is enabled by the location request manager 20 (hereinafter "system request") via the request scheduler 34, or alternatively, by the monitoring agent 13 (step 106). The system request is preferably enabled substantially autonomously without direct user input based on a particular schedule or one or more particular criteria (step 104). The particular schedule can be extrapolated using the request scheduler 34 from prior requests from a requester or a plurality of requesters, which prior requests can be retrieved from the user request datastore 28. A particular criterion can be met for example when a potential requester of location information initiates a user interface of an application capable of facilitating a request, such as the request interface 26 or application user interface 19, wherein the system request is enabled responsive to such potential requester logging into or otherwise initiating the respective interface.

The system location request can be made to the location determining system ("LDS") 15 on the mobile device 12 or a position determining entity ("PDE") 45, for example a PDE enabled by a telecommunication carrier API or API of another aggregator of mobile device location information. The mobile device location information is received responsive to the system request via the monitoring API 32 and stored in the system request datastore 30 (step 108). Alternatively, the location request can be provided to a plurality of location data sources, and location information received from the plurality of location data sources can be filtered based on one or more criteria, for example removing location data not satisfying the criteria. The method returns to step 104 to enable the next system location request based on the particular schedule or one or more criteria.

In a preferably parallel process, a request for location information of the mobile device 12 is received from a requester (hereinafter "user request") by the location request manager 20 via the request interface 26 or application interface 19 (step 110). Whereas the system location request (see step 106) is generated by the location request manager 20, the user location request (see step 110) is user-generated by a requester. The requester can be for example a user of the mobile device 12 who delivers her request via the application interface 19. Alternatively, the requester can be another user who delivers her request for the location of mobile device 12 via the request interface 26. The user request is stored in the user request datastore 28.

A user-visible request consequence is triggered responsive to the user request (step 112) via the consequence trigger 38. The request consequence can include for example generating a history view showing location requests to a requesting user, a monitored user or a person with administrative privileges corresponding to the monitored mobile device. Other example request consequences include initiating billing events based on the location requests, notifying a monitored user of a location request made for the monitored user's location by another user, and throttling (i.e. limiting) the number of location requests allowed by a user wherein requests exceeding a predetermined number or duration are precluded. The location request manager 20 can enable the request consequences through communication with application servers 47 such as telecommunication carrier billing or privacy management application servers. Alternatively, request consequences can be enabled by providing data directly to the monitored mobile device 12 or a client device 16 of a user who requests a mobile device's location. Such data can include for example a history view of location requests and corresponding location data.

Responsive to the user location request, it is determined whether there is any fresh location information received responsive to the system request (step 114). Whether system-requested location information is fresh can be determined in part or whole based on how old the system-requested location information is. If it is determined that there exists system-requested location information which meets a particular level of freshness and which the requester has not yet seen, the system-requested location information is provided to the requester (step 116). The particular level of freshness can correspond for example to a predetermined length of time since the location information was one of generated, received, or accessed, wherein the particular level of freshness is met if the system location information is one of generated, received or accessed within the predetermined length of time. The particular level of freshness for which system-requested location information is provided to the requester can be dependent on the precision of the system-requested location information. For example, less fresh location information may be tolerable if such location information is more precise, wherein the particular level of freshness is lower (i.e. less fresh) for more precise location information. The corresponding system-requested location information is preferably copied from the system request datastore 30 to the user request datastore 28 to initiate display to the requester. The method thereafter returns to step 110 to await a next user location request.

If there is no system-requested location information which meets a required level of freshness (e.g. too old or nonexistent), it is determined whether a system location request is pending (step 118). A system location request is pending when it has been enabled by the location request manager 20 or the monitoring agent 13, but no location has yet been received. If a system location request is pending, a wait (ΔT) is initiated for the location information responsive to the system request (step 120), and the method returns to step 114. When the system-requested location information is finally received, it is provided to the requester (step 116).

If it is determined that no location information is pending, the user location request made by the requester is enabled via the location request manager 20 (step 122). The user location request can be made to the LDS 15 on the mobile device 12 or the PDE 45, for example a PDE enabled by a telecommunication carrier API or API of another aggregator of mobile device location information. The user-requested location information is received via the location request manager 20 or monitoring agent 13 and stored in the user request datastore 28 (step 124). Alternatively, the location request can be provided to a plurality of location data sources, and location information received from the plurality of location data sources can be filtered based on one or more criteria. The user-requested location information is provided to the requester (step 126), and the method returns to step 110 to await the next user request.

The location request manager 20 or monitoring agent 13 is not required to continually submit system requests to obtain location information. Location information can be contributed automatically from an external source such as a local application on the mobile device 12 or a remote network based application server 47. For example, the system request datastore 30 can accept location results proactively contributed by an external source, e.g. a location reporting client tag 21 on the mobile device 12, so that the system request datastore 30 includes a superset of the location information contained in the user request datastore 28. A subset of the location activity contributed by the external source, the subset including requests and results based on user request and found in the user request datastore 28, triggers request consequences.

Referring further to FIGS. 3A-3D, example screen displays 60 of the devices 12, 16 corresponding to the above-described user-visible request consequences are shown. The displays 60 can be enabled for example by the application interface 19 on the monitored mobile device 12 or the request interface 26 on the client device 16. In FIG. 3A a screen display 60 of a mobile device 12 shows a notice 62 showing a history of names of users who requested the location of the mobile device 12 and showing the respective request times. The request consequence for the requester corresponds to a display of the requester's name on the monitored user's mobile device 12. In FIG. 3B the screen display 60 shows a notice 64 provided to a location requester on her client device 16 showing a history of names of monitored users whose location the requester requested using the client device 16 via the request interface 26. In FIG. 3C the screen display 60 shows a notice 66 provided to a location requester on her client device 16 showing billing items corresponding to her requests for location of one or more monitored users. In FIG. 3D the screen display 60 shows a notice 68 provided to a location requester on her client device 16 indicating she has exceeded a number of allotted location requests. The screen displays 60 shown in FIGS. 3A-3D are exemplary and other screen displays may correspond to a user-visible request consequence. Further, a user-visible request consequence need not correspond to a screen display, but can correspond to any action observable by a user. For example, if the user-visible consequence is a throttling of location requests, the requester may notice a slowdown of application functionality without any screen display notice related to the consequence.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A computer-implemented method for disseminating user mobile device location information comprising:
    enabling a first request for location information of a mobile device based on at least one of a particular schedule and a particular criterion;
    receiving the mobile device location information provided responsive to the first request;
    storing the mobile device location information received responsive to the first request;
    receiving from a requester a second request for the mobile device location information;
    responsive to the second request providing the requester the location information received responsive to the first request; and
    initiating at least one user-visible consequence responsive to the second request, wherein the at least one user-visible consequence is not initiated responsive to the first request;
    wherein the user-visible consequence comprises providing a notification informing a user of the second request.

2. The method of claim 1, wherein the mobile device corresponds to a first user and the requester is a second user.

3. The method of claim 1, wherein the mobile device corresponds to a first user and the requester is the first user.

4. The method of claim 1, further comprising sending at least one of the first request and the second request to a telecommunication carrier Application Program Interface (API).

5. The method of claim 1, wherein the user is a user of the mobile device.

6. The method of claim 1, wherein when the first request for location information is pending when the second request is received, awaiting the location information provided in response to the first request and providing the awaited-for location information after it is received.

7. The method of claim 1, further comprising initiating the first request responsive to the requester initiating an application user interface.

8. The method of claim 1, wherein the schedule is predetermined as an extrapolation of previous requests from the requester.

9. The method of claim 1, wherein the first request does not trigger a user-visible consequence.

10. The method of claim 1, further comprising:
    determining that the requester has not yet seen the location information received responsive to the first request; and further responsive to the determination that the requester has not yet seen the location information received responsive to the first request, providing the requester the location information received responsive to the first request.

11. The method of claim 1, wherein receiving the mobile device location information provided responsive to the first request comprises receiving location information from an external source which location information is contributed automatically by the external source.

12. A computer-implemented method for disseminating user mobile device location information comprising:
enabling a first request for location information of a mobile device based on at least one of a particular schedule and a particular criterion;
receiving the mobile device location information provided responsive to the first request;
storing the mobile device location information received responsive to the first request;
receiving from a requester a second request for the mobile device location information;
responsive to the second request providing the requester the location information received responsive to the first request; and
initiating at least one user-visible consequence responsive to the second request, wherein the at least one user-visible consequence is not initiated responsive to the first request;
wherein the user-visible consequence comprises providing to the requester a history including at least one of an indication of the second request and the location information.

13. The method of claim 12, wherein the user-visible consequence comprises providing a history including at least one of an indication of the second request and the location information to at least one of a user of the mobile device and a person with administrative privileges corresponding to the mobile device.

14. A computer-implemented method for disseminating user mobile device location information comprising:
enabling a first request for location information of a mobile device based on at least one of a particular schedule and a particular criterion;
receiving the mobile device location information provided responsive to the first request;
storing the mobile device location information received responsive to the first request;
receiving from a requester a second request for the mobile device location information;
responsive to the second request providing the requester the location information received responsive to the first request; and
initiating at least one user-visible consequence responsive to the second request, wherein the at least one user-visible consequence is not initiated responsive to the first request;
wherein the user-visible consequence comprises initiating a billing event.

15. A computer-implemented method for disseminating user mobile device location information comprising:
enabling a first request for location information of a mobile device based on at least one of a particular schedule and a particular criterion;
receiving the mobile device location information provided responsive to the first request;
storing the mobile device location information received responsive to the first request;
receiving from a requester a second request for the mobile device location information;
responsive to the second request providing the requester the location information received responsive to the first request; and
initiating at least one user-visible consequence responsive to the second request, wherein the at least one user-visible consequence is not initiated responsive to the first request;
wherein the user-visible consequence comprises limiting additional requests for the mobile device location information.

16. The method of claim 15, wherein limiting the additional requests comprises precluding additional requests for the mobile device location information.

17. A computer-implemented method for disseminating user mobile device location information comprising:
enabling a first plurality of requests for location information of a mobile device based on at least one of a particular schedule and a particular criterion;
receiving the mobile device location information provided responsive to the first plurality of requests;
storing the mobile device location information received responsive to the first plurality of requests;
receiving from a requester a second plurality of requests for the mobile device location information;
for ones of the second plurality of requests which when received correspond to stored location information meeting a particular level of freshness, providing the requester the location information meeting the particular level of freshness received responsive to a corresponding earlier one of the first plurality of requests;
for ones of the second plurality of requests received while one of the first plurality of requests is pending, providing the requester the location information received responsive to the pending request when available; and
for ones of the second plurality of requests not corresponding to location information meeting a particular level of freshness and not received while one of the first plurality of requests is pending, enabling the one of the second plurality of requests for the mobile device location information, receiving the mobile device location information provided responsive to the one of the second plurality of requests, and providing the requester the location information received responsive to the one of the second plurality of requests;
wherein the second plurality of requests corresponds to at least one user-visible consequence which does not correspond to the first plurality of requests.

18. The method of claim 17, wherein the user-visible consequence comprises providing an indication of a request to the requester.

19. The method of claim 17, wherein the user-visible consequence comprises providing a user-visible history including at least one of an indication of a request and location information corresponding to the request to at least one of a user of the mobile device and a person with administrative privileges corresponding to the mobile device.

20. The method of claim 17, wherein the user-visible consequence comprises initiating a billing event.

21. The method of claim 17, wherein the location information received in response to the second plurality of requests corresponds to the at least one user-visible consequence which does not correspond to the location information received in response to the first plurality of requests.

22. The method of claim 17, further comprising:
   storing the first plurality of requests and corresponding mobile device location information in at least a first data store; and
   storing the second plurality of requests and corresponding mobile device location information in at least a second data store separate from the at least the first data store;
   wherein the at least the second store corresponds to at least one user-visible consequence which does not correspond to the at least the first data store.

23. The method of claim 22, further comprising for ones of the second plurality of requests which when received correspond to stored location information meeting a particular level of freshness, copying the location information meeting the particular level of freshness received responsive to a corresponding earlier one of the first plurality of requests from the at least the first data store to the at least the second data store.

24. The method of claim 22, further comprising for ones of the second plurality of requests received while one of the first plurality of requests is pending, copying the location information received responsive to the pending request, when available, to the at least the second data store.

25. The method of claim 22, further comprising for ones of the second plurality of requests which when received correspond to stored location information not previously provided to the requester, copying the corresponding location information from the at least the first data store to the at least the second data store.

26. The method of claim 17, wherein enabling a request comprises providing the request to a plurality of location data sources, the method further comprising filtering location information received from the plurality of location data sources based on at least one predetermined criterion.

27. The method of claim 17, wherein receiving the mobile device location information provided responsive to the first plurality of requests comprises receiving location information from an external source via a network which location information is contributed automatically by the external source.

28. A system comprising a non-transitory computer readable storage medium having encoded thereon instructions that, when executed by one or more processors of the system, cause the system to perform a process including:
   enabling a first plurality of requests for location information of a mobile device based on at least one of a particular schedule and a particular criterion;
   receiving the mobile device location information provided responsive to the first plurality of requests;
   storing the mobile device location information received responsive to the first plurality of requests;
   receiving from a requester a second plurality of requests for the mobile device location information;
   determining ones of the second plurality of requests which when received correspond to stored location information meeting a particular level of freshness, and for the ones of the second plurality of requests which when received correspond to stored location information meeting a particular level of freshness, providing the requester the location information meeting the particular level of freshness received responsive to a corresponding earlier one of the first plurality of requests;
   for ones of the second plurality of requests received while one of the first plurality of requests is pending, providing the requester the location information received responsive to the pending request when available; and
   for ones of the second plurality of requests not corresponding to location information meeting a particular level of freshness and not received while one of the first plurality of requests is pending, enabling the one of the second plurality of requests for the mobile device location information, receiving the mobile device location information provided responsive to the one of the second plurality of requests, and providing the requester the location information received responsive to the one of the second plurality of requests;
   wherein the second plurality of requests corresponds to at least one user-visible consequence which does not correspond to the first plurality of requests.

29. Non-transitory computer-readable media tangibly embodying a program of instructions executable by a computing device to implement a method, the computing device being capable of interfacing with a communications network, the method comprising:
   enabling a first plurality of requests for location information of a mobile device based on at least one of a particular schedule and a particular criterion;
   receiving the mobile device location information provided responsive to the first plurality of requests;
   storing the mobile device location information received responsive to the first plurality of requests;
   receiving from a requester a second plurality of requests for the mobile device location information;
   determining ones of the second plurality of requests which when received correspond to stored location information meeting a particular level of freshness, and for the ones of the second plurality of requests which when received correspond to stored location information meeting a particular level of freshness, providing the requester the location information meeting the particular level of freshness received responsive to a corresponding earlier one of the first plurality of requests;
   for ones of the second plurality of requests received while one of the first plurality of requests is pending, providing the requester the location information received responsive to the pending request when available; and
   for ones of the second plurality of requests not corresponding to location information meeting a particular level of freshness and not received while one of the first plurality of requests is pending, enabling the one of the second plurality of requests for the mobile device location information, receiving the mobile device location information provided responsive to the one of the second plurality of requests, and providing the requester the location information received responsive to the one of the second plurality of requests;
   wherein the second plurality of requests corresponds to at least one user-visible consequence which does not correspond to the first plurality of requests.

* * * * *